Aug. 2, 1955 S. D. BAKER 2,714,280
CUTTER BAR FOR MOWING MACHINES
Filed Oct. 12, 1954 3 Sheets-Sheet 1
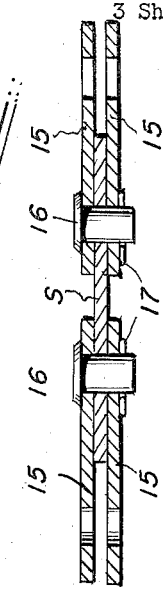
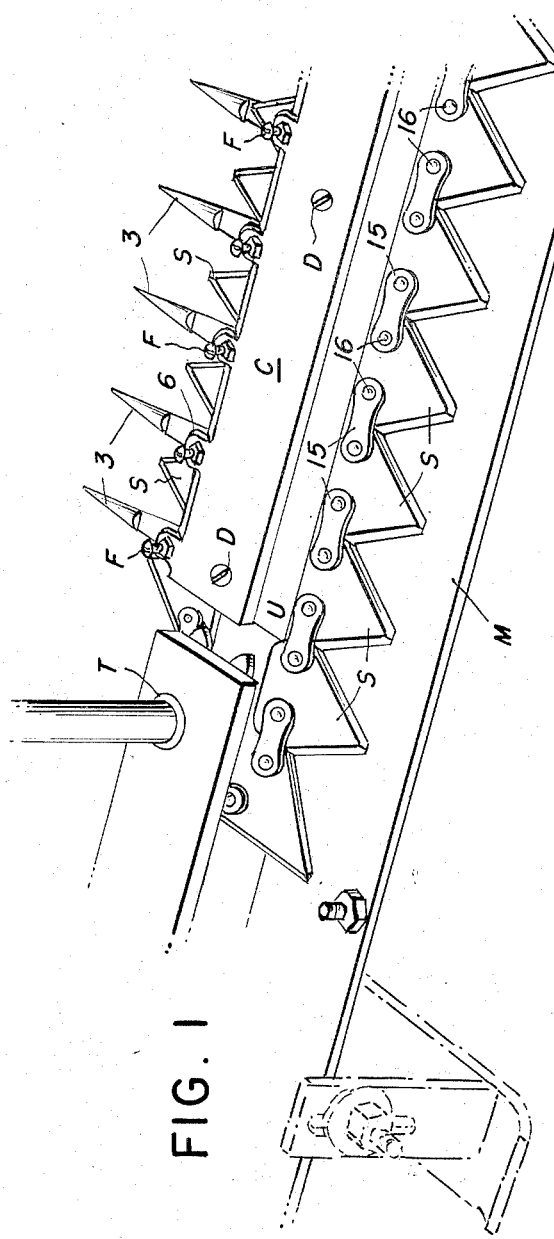
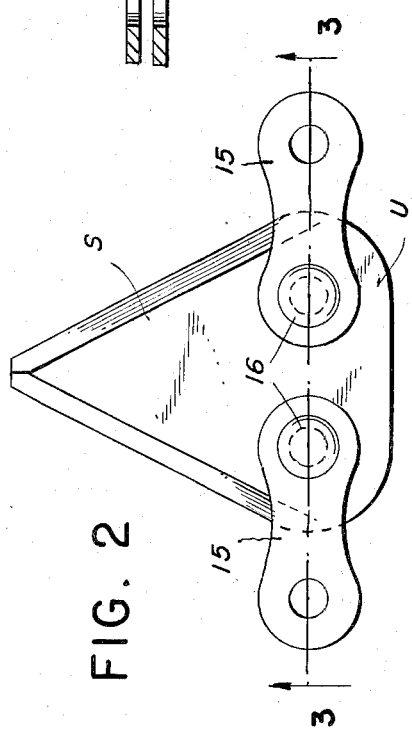
INVENTOR.
STUART D. BAKER
BY
*James M. Drysdale*
ATTORNEY Aug. 2, 1955 S. D. BAKER 2,714,280
CUTTER BAR FOR MOWING MACHINES
Filed Oct. 12, 1954 3 Sheets-Sheet 2
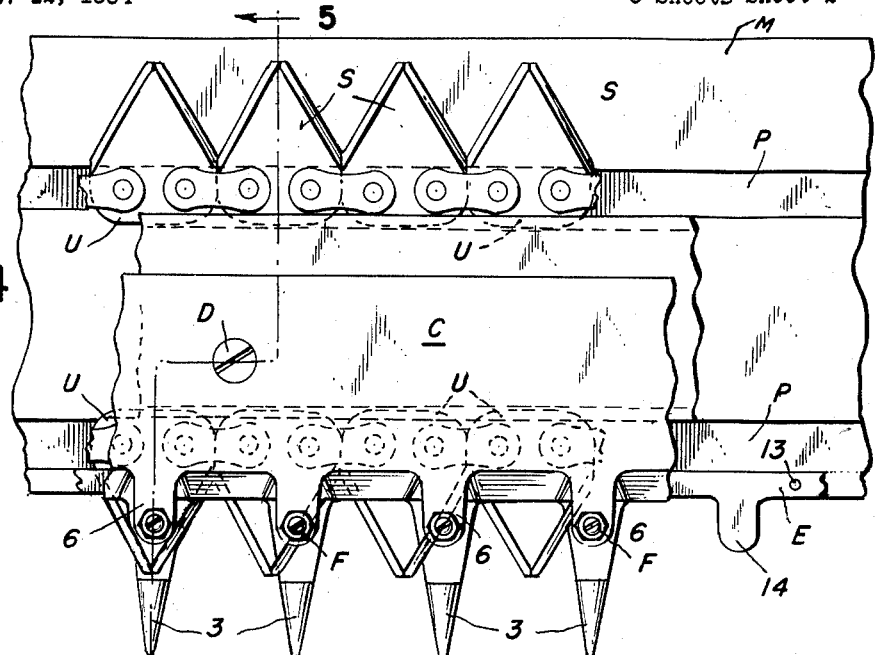
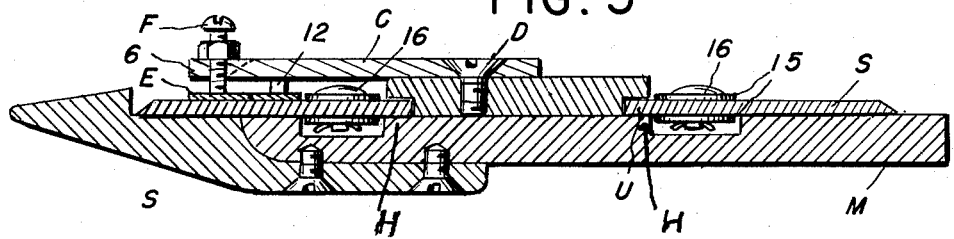
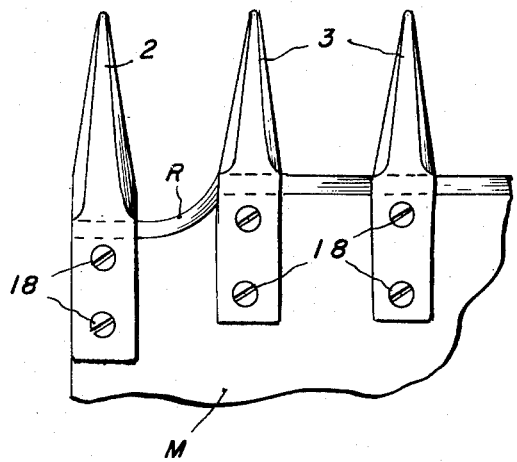
INVENTOR.
STUART D. BAKER
BY
*James M. Drysdale*
ATTORNEY Aug. 2, 1955
S. D. BAKER
2,714,280
CUTTER BAR FOR MOWING MACHINES
Filed Oct. 12, 1954
3 Sheets-Sheet 3
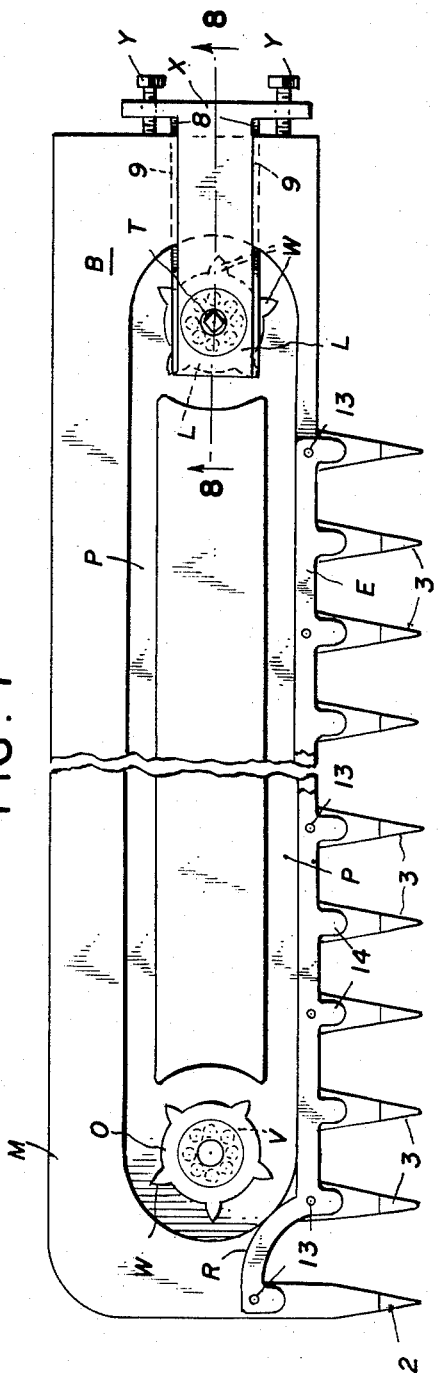
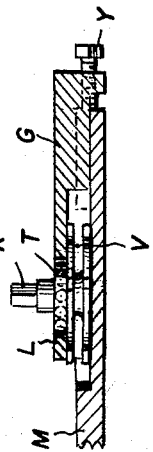
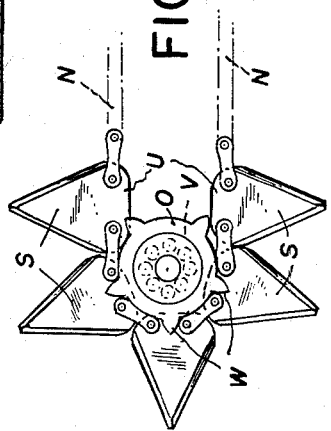
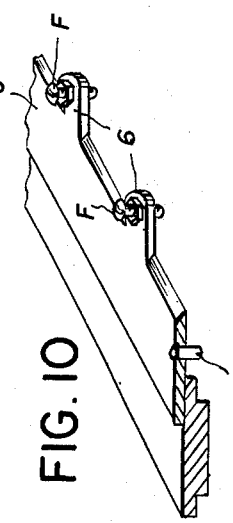
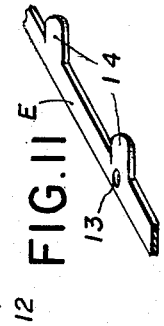
INVENTOR.
STUART D. BAKER
BY
James M. Drysdale
ATTORNEY United States Patent Office 2,714,280
Patented Aug. 2, 1955

2,714,280

CUTTER BAR FOR MOWING MACHINES

Stuart D. Baker, Washington, D. C.

Application October 12, 1954, Serial No. 461,882

4 Claims. (Cl. 56—291)

This invention relates to a cutter bar which is used on mowing and harvesting machines and the like in which the cutting knives or sections are attached together by links thus forming a chain having a continuous travel in either direction to accomplish the cutting action, said chain passing around double sprocket wheels located at each end of the cutter bar.

This application is a continuation in part of an earlier application Ser. No. 375,377, filed August 20, 1953, and now abandoned, by the same inventor since the two applications are co-pending and a substantial part of the disclosure of the first is disclosed in connection with other matter in the second.

The invention has for its object to provide devices whereby a cutter bar of the class mentioned may be rendered more convenient of operation, simpler in construction and whereby friction of the working parts will be reduced to a minimum.

Another object of this invention is to provide a cutter bar having endless cutters adapted to function equally as well at low or high speed travel of the machine. The continuous cutting action of this cutter bar enables this machine to handle a larger volume of material such as grain crops, hay, grass and the like. Modern tractors, and harvesting machines are designed for fast ground travel which has created a demand for a cutter bar to handle the cutting of grain crops, hay or other material at a high rate of ground travel. Another advantage of this design will allow the knife sections to travel flat on the guard face even if the guards are out of line. This is accomplished by providing a connecting link between each section, allowing some flex in the knife.

The invention also provides a special outer end guard so that the knife sections can travel over the face of the guard. The guards are attached to the under side of the cutter bar by screws which pass through the center of the body portions of the guards.

Another object of this invention is to provide a bevelled top plate having finger projections at front edge provided with adjusting screws and a space bar or bearing plate positioned beneath the top plate and also having finger projections beneath the adjusting screws.

Another object of the invention is to provide cutting sections having bevelled cutting edges and projecting bases adapted to ride or slide in the groove guide.

It will be observed that the knife sections are spaced closer together than the guards so that the sections approach the guards in different sequence, thus rendering the cutting action continuous and uniform so that less power is required to drive the cutting mechanism with smoother operation and with less vibration.

With these and other objects in view, my invention results in the improved construction, arrangement and combination of parts, which will be hereinafter fully described, and particularly pointed out in the claims.

In the accompanying drawings,

Fig. 1 is a fragmentary plan view of the cutter bar embodying my improvements.

Fig. 2 is an enlarged top plan view of one of the cutting knife sections and flat links and cotter pins for connecting together the knife sections.

Fig. 3 is a sectional view along the line 3—3 of Fig. 2 looking in the direction of the arrows and showing a cutting knife section associated with top and bottom flat links and cotter pins extending through said links and sections.

Fig. 4 is a fragmentary plan view of the cutter bar showing the relative position of the top plate over the space bar or bearing plate, the cutting mechanism travelling in the grooved lower plate with the guards attached beneath.

Fig. 5 is a sectional view along the line 5—5 of Fig. 4 looking in the direction of the arrows.

Fig. 6 is a fragmentary plan view of the underside of the cutter bar showing means for attaching the guides to the underside of the cutter bar.

Fig. 7 is a top plan view of the cutter bar with the top plate and cutting mechanism removed but showing the grooved lower plate and relative position of the space bar over the guides and also showing tension means for taking up slack in the driving chain.

Fig. 8 is a sectional view along the line 8—8 of Fig. 7 looking in the direction of the arrows 8—8 and showing the tension means for taking up slack.

Fig. 9 is a top plan view of the double driven sprocket and the cutters and chain.

Fig. 10 is a fragmentary plan view of the bevelled top plate having finger projections provided with adjusting screws.

Fig. 11 is a fragmentary plan view of the space bar provided with finger projections.

There is a sliding plate or adjustable drive chain adjuster, G, in the main bar with grooves, 9, on each side to hold it in place. The housing and clamp for the main drive shaft bearing is mounted on the one end and the sliding plate, X, is adjusted with set screws, Y. The tension on the chain is adjusted by moving this plate, X, out and in which also moves the bearing and drive sprocket out or in. This adjustment will release the chain when desired to remove it from the sprockets and cutter bar.

The same letters and numerals of references indicate the same parts in all the figures.

The cutter bar herein described could be used with binders, combines, harvesters and the like.

Th sprocket wheel, L, through the medium of the endless driving chain, N, rotates the sprocket wheel, O, located at the outer end of the cutter bar, M. Both sprocket wheels, L and O, are what is known as double sprockets and have a continuous recess in the center face of each sprocket. The base on back of the cutting knife sections engages the continuous recessed portion of the sprockets. As shown in Fig. 4 and Fig. 7, the top of the cutter bar plate, B, is grooved at P to provide a guide passage for the chain links. On the front edge of the cutter bar plate, B, are attached a series of equally spaced guards, 3, and an end guard, 2.

Between the first and second outside end guards, 2 and 3, the outside corner of the cutter bar plate, B, is bevelled off or tapered at R as shown in Figs. 6 and 7 to allow the knife sections to travel over the end guard.

The purpose in tapering off the front outer corner of the cutter bar is to mount the outer guard at a recessed position in relation to the other guards. By this design the cutting sections will travel full over the face of the outer guard without projecting over the outer end of the cutter bar. This position of the outer guard is deemed essential for the cutting knife rotation over the guards. Should the outer guard not be recessed, it would be necessary to have the idler sprocket nearer the outer end of the main bar to get full cutting action on the end guard. By moving the idler sprocket nearer the outer end would cause the cutting sections to extend out over the end of main bar.

The end guard is mounted on the cutter bar same as all the other guards. The difference is that this guard is slightly longer than the other guards, due to the recess on the bar. The general design of this end guard is similar to the other guards.

It will be observed that each of the knife sections, S, is provided with a curved projecting base, U, which engages the recessed portions, V, between the sprockets, W, of the sprocket wheels, L and O, thereby insuring a constant travel and accurate position of the driving chain, N.

There is provided an adjustable drive chain adjuster, G, which carries the bearings, T, for the drive sprocket wheel, L, mounted on the drive shaft, K, which is moved out or in by means of the adjusting screws, Y, since the tongue, 8, on the plate, B, is slidable in the groove, 9, on the side of the sliding plate, X, as shown in Figs. 7 and 8. The drive shaft, K, of the cutter bar may be operated by auxiliary power by using universal joints, belts, or hydraulic drive.

The cutter bar guards are attached to the under side of the cutter bar, M, by screws 18 as clearly shown in Fig. 6. As is customary in machines of this type, the cutter bar and cutting mechanism is supported on the ground at its driven end by a shoe and at its other end by a roller or shoe, which also rests upon the ground and may be adjusted in a well known manner. Such supporting means are only partially shown since their use is quite common.

Fig. 1 shows the cutter bar with the top plate, C, in position and secured to the cutter bar by means of screws, D. Under the lower front edge of the top plate, C, is mounted a long space bar or bearing plate, E, which is curved at the outer end as shown in Fig. 7, and which is clamped firmly in position by means of the adjusting screws, F, and dowel pins, 12, shown in Fig. 10, in front portion of the top plate and projecting down through holes, 13, shown in Fig. 11, in the space bar or bearing plate, E. The bar, E, is positioned ahead of the groove, P. The bar, E, is partly over the front edge of the bottom plate and has finger projections, 14, over each guard, directly under finger projections of the top plate for the purpose of adjusting the bar, E, up or down to hold cutting knife sections firmly on the face of the guards to accomplish a good shearing action when the cutting knives travel over the guards. Top and bottom flat links, 15, connect together said knife sections by means of cotter pins, 16, extending through said links and sections. A cotter key, 17, is mounted in each cotter pin, 16, for removing and replacing knife sections.

The adjustable bar, E, also holds top of section links in proper position for traveling in groove, P.

It will be observed that the double drive sprocket wheel, L, is provided with preferably 5 uniformly spaced teeth, W, on the top and the bottom sprocket sections and the chain links, Z, of the driving chain are all of approximately equal length, thus insuring smooth easy running of the machine.

The cutting knife sections may be of the forms shown in Fig. 1, Fig. 4 or Fig. 9. In either form the cutting knife section is provided with a projecting base, U, the edge of which rests on the shoulder, H, when the knife is traversing the cutter bar with the top plate, C, in position as clearly shown in Figs. 4 and 5. In the construction above described the top plate, C, has extended portions, 6, over each guard and adjusting screws, F, extending through the same. By screwing down the screws, F, the space bar, E, can be brought into closer proximity to the cutting knives so as to keep them in place. Another essential function of the extended portions, 6, or finger projections on the top plate and space bar is to act as a stop to prevent the cut material from traveling in direction of knife travel. The finger projections are equally spaced and extend only part way over the face of the guards.

From the foregoing description taken in connection with the drawings hereto annexed, the operation and advantages of my invention will be readily understood. The general construction of the machine is simple and inexpensive, and the parts of the same combine and cooperate in such a manner as to produce the best possible results with a minimum number of parts and without the use of complicated and costly mechanism.

I desire it to be understood that while I have in the foregoing described a simple and preferred form of my invention, I do not necessarily limit myself to the structural details herein set forth, but reserve the right to any changes, alterations, and modifications within the scope of my invention which may be resorted to without departing from the spirit or sacrificing the utility of the same.

Having thus described my invention, I claim:

1. In a mowing machine, a cutter bar having a lower plate attached thereto and extending therealong, guards extending laterally from said lower plate, a cutting member movably mounted along one side edge of said cutter bar, said cutting member having operative engagement with said cutter bar, said lower plate and said guards, a top plate on said cutter bar having portions extending laterally over said guards, a bearing plate operatively associated with said top plate and having vertical movement with respect thereto, and adjusting means between said top plate and said bearing plate to cause said cutting members to have shearing action with said guards.

2. In a mowing machine, a cutter bar having a lower plate attached thereto and extending therealong, equally spaced guards extending laterally from said lower plate and cutting member consisting of links and knife sections movably mounted along one side edge of said cutter bar, said cutting member having operative engagement with said cutter bar, said lower plate and said guards, a top plate on said cutter bar having equally spaced finger projections on the front edge of the top plate extending only part way over the face of the guards, a bearing plate operatively associated with said top plate and having vertical movement with respect thereto, and adjusting means between said top plate and said bearing plate to cause said cutting members to have shearing action with said guards.

3. In a mowing machine, a cutter bar having a lower plate attached thereto and extending therealong equally spaced guards attached to and extending laterally from said lower plate, cutting knife sections movably mounted along one side edge of said cutter bar, said cutting knife sections having operative engagement with said cutter bar, said lower plate and said guards, a top plate on said cutter bar having equally spaced finger projecting on the front edge of the top plate extending laterally part way over the face of the guards, a bearing plate mounted under the lower front edge of the top plate, the bearing plate also provided with finger projections equally spaced and positioned beneath the finger projections on the front edge of the top plate, dowel pins in the top plate adapted to pass through holes in the bearing plate, adjusting screws passing through the finger projections of the top plate and adjusting the bearing plate to hold the cutting knife sections firmly on the face of the guards.

4. In a mowing machine, a cutter bar having a channelled lower plate attached thereto and extending therealong, guards extending laterally from said lower plate, cutting knife sections movably mounted and traversing the channel of the lower plate, a groove at one edge of the channel for the projecting base of each cutting knife section to travel in, said knife sections having operative engagement with said cutter bar, said lower plate and said guards, a top plate on said cutter bar having portions extending laterally part way over the face of the guards, a bearing plate operatively associated with said top plate and having vertical movement with respect thereto and adjusting means between the top plate and said bearing plate to cause said cutting members to have shearing action with said guards.

References Cited in the file of this patent

UNITED STATES PATENTS

| Number | Name | Date |
|---|---|---|
| 13,433 | Morrison | Aug. 14, 1855 |
| 383,057 | Kendrick | May 15, 1880 |
| 765,126 | Chaplin | July 12, 1904 |
| 941,400 | Wolfrom | Nov. 30, 1909 |
| 2,186,126 | Roll | Jan. 9, 1940 |
| 2,304,174 | Hurst | Dec. 8, 1942 |
| 2,488,886 | Young | Nov. 22, 1949 |